US010497929B2

(12) United States Patent
Lee et al.

(10) Patent No.: US 10,497,929 B2
(45) Date of Patent: Dec. 3, 2019

(54) ANODE FOR SECONDARY BATTERY AND SECONDARY BATTERY INCLUDING THE SAME

(71) Applicant: LG Chem, Ltd., Seoul (KR)

(72) Inventors: Jin-Uk Lee, Daejeon (KR); Ji-Woo Kim, Daejeon (KR); Min-Hee Lee, Daejeon (KR)

(73) Assignee: LG Chem, Ltd. (KR)

( * ) Notice: Subject to any disclaimer, the term of this patent is extended or adjusted under 35 U.S.C. 154(b) by 116 days.

(21) Appl. No.: 15/572,377

(22) PCT Filed: Aug. 25, 2016

(86) PCT No.: PCT/KR2016/009458
§ 371 (c)(1),
(2) Date: Nov. 7, 2017

(87) PCT Pub. No.: WO2017/034351
PCT Pub. Date: Mar. 2, 2017

(65) Prior Publication Data
US 2018/0287136 A1 Oct. 4, 2018

(30) Foreign Application Priority Data
Aug. 25, 2015 (KR) .................. 10-2015-0119619

(51) Int. Cl.
*H01M 4/13* (2010.01)
*H01M 4/133* (2010.01)
(Continued)

(52) U.S. Cl.
CPC .......... *H01M 4/133* (2013.01); *H01M 4/587* (2013.01); *H01M 4/622* (2013.01); *H01M 4/625* (2013.01);
(Continued)

(58) Field of Classification Search
CPC ...... H01M 4/133; H01M 4/587; H01M 4/622; H01M 4/625; H01M 4/626; H01M 10/052;
(Continued)

(56) References Cited

U.S. PATENT DOCUMENTS 8,758,959 B2 * 6/2014 Mei .................. C23C 14/205
429/527
2006/0115739 A1 6/2006 Yamaguchi et al.
(Continued)

FOREIGN PATENT DOCUMENTS

JP H103920 A 1/1998
JP H10334887 A 12/1998
(Continued)

OTHER PUBLICATIONS

Search report from International Application No. PCT/KR2016/009458, dated Dec. 27, 2016.
(Continued)

*Primary Examiner* — Raymond Alejandro
(74) *Attorney, Agent, or Firm* — Lerner, David, Littenberg, Krumholz & Mentlik, LLP

(57) ABSTRACT

An anode for a secondary battery in which Sn metal powder particles function as a conductive material in combination with a carbonaceous conductive material, and a secondary battery including the anode and having improved electroconductivity are provided. The secondary battery including the anode has improved electroconductivity and reduced resistance, and thus can show excellent output performance.

11 Claims, 8 Drawing Sheets

(51) Int. Cl.
*H01M 4/587* (2010.01)
*H01M 4/62* (2006.01)
*H01M 10/0525* (2010.01)
*H01M 4/02* (2006.01)

(52) U.S. Cl.
CPC ....... *H01M 4/626* (2013.01); *H01M 10/0525* (2013.01); *H01M 2004/027* (2013.01)

(58) Field of Classification Search
CPC ........ H01M 10/0525; H01M 2004/027; Y02T 10/7011
See application file for complete search history.

(56) References Cited

U.S. PATENT DOCUMENTS

| | | |
|---|---|---|
| 2006/0263693 A1 | 11/2006 | Kim et al. |
| 2009/0023065 A1 | 1/2009 | Hwang et al. |
| 2012/0183860 A1 | 7/2012 | Naoi et al. |
| 2013/0011747 A1* | 1/2013 | Sasaki ................ H01M 4/0404 429/336 |
| 2013/0089791 A1 | 4/2013 | Chang et al. |
| 2014/0234710 A1 | 8/2014 | Lee et al. |
| 2014/0295249 A1 | 10/2014 | Hotta et al. |
| 2016/0043384 A1* | 2/2016 | Zhamu ................ H01M 4/133 429/231.4 |

FOREIGN PATENT DOCUMENTS

| | | |
|---|---|---|
| JP | 2006100244 A | 4/2006 |
| JP | 2006310302 A | 11/2006 |
| JP | 2010067580 A | 3/2010 |
| JP | 2010218848 A | 9/2010 |
| JP | 2014082084 A | 5/2014 |
| KR | 20120091084 A | 8/2012 |
| KR | 20130008870 A | 1/2013 |
| KR | 20130122217 A | 11/2013 |
| KR | 101386163 B1 | 4/2014 |
| KR | 20140104066 A | 8/2014 |

OTHER PUBLICATIONS

Supplementary European Search Report for Application EP16839639 dated Jul. 6, 2018.

* cited by examiner

ANODE FOR SECONDARY BATTERY AND SECONDARY BATTERY INCLUDING THE SAME

CROSS-REFERENCE TO RELATED APPLICATIONS

The present application is a national phase entry under 35 U.S.C. § 371 of International Patent Application No. PCT/KR2016/009458 filed Aug. 25, 2016, which claims priority from Korean Patent Application No. 10-2015-0119619 filed on Aug. 25, 2015, the disclosures of which are incorporated herein by reference.

TECHNICAL FIELD

The present disclosure relates to an anode for a secondary battery and a secondary battery including the same. More particularly, the present disclosure relates to an anode for a secondary battery which uses Sn metal powder particles as an anode conductive material in combination with a carbonaceous conductive material, and a secondary battery including the anode.

BACKGROUND ART

In recent times, use of secondary batteries have been increased rapidly as power sources for portable electronic appliances, such as personal digital assistants (PDA) and portable multimedia players (PMP); power sources for driving motors of high-output hybrid vehicles, electric vehicles, or the like; and power sources for flexible display devices, such as electronic ink (e-ink), electronic paper (e-paper), flexible liquid crystal display devices (LCD), flexible organic light emitting diodes (OLED), or the like. In addition, applicability of such secondary batteries as power sources for integrated circuit devices on printed circuit boards is increased.

An embodiment of a lithium secondary battery includes an anode using a carbonaceous material, such as graphite, as an active material; a cathode using a lithium transition metal oxide as an active material; a separator; and an electrolyte. The cathode or anode active material of such a lithium secondary battery fundamentally has no electroconductivity. Thus, a conductive network is formed by coating a conductive material onto the surface of spherical active material particles in order to increase electroconductivity.

In addition, in a lithium secondary battery using a metal-based, such as silicon-based, or metal oxide-based anode active material, a method has been developed to reduce the resistance caused by the active material and to resist a large volumetric change of an anode active material during charging/discharging.

In general, a carbonaceous conductive material, particularly amorphous carbon, such as Super-C, is used as a conductive material. However, it is required to form a larger conductive network of an electrode by developing and using a material having higher electroconductivity as compared to carbon.

DISCLOSURE

Technical Problem

The present disclosure is designed to solve the problems of the related art, and therefore the present disclosure is directed to providing an anode which imparts high electroconductivity while not adversely affecting the performance characteristics, such as output, of a finished secondary battery.

The present disclosure is also directed to providing a lithium secondary battery which uses the anode and shows excellent output performance.

Technical Solution

In one aspect of the present disclosure, there is provided an anode for a secondary battery which includes an anode current collector and a carbonaceous anode active material layer formed on at least one surface of the anode current collector, wherein Sn metal powder particles are incorporated as a conductive material in combination with a carbonaceous conductive material.

The Sn metal powder particles may be bound to the carbonaceous anode active material through a binder polymer.

The Sn metal powder particles and the carbonaceous conductive material may be used at a ratio of 1:1-5:1 on the weight basis.

The Sn metal powder particle may be present in an amount of 1-5 wt % based on 100 wt % of the anode active material.

The Sn metal powder particles may have a particle diameter corresponding to 10% or less of the diameter of the active material particles.

The Sn metal powder particles may have an average diameter of 0.01-1 μm.

The carbonaceous conductive material may be carbon black primary particles having a spherical shape with an average particle diameter of 10-50 nm.

The carbonaceous conductive material may be fibrous graphite capable of point contact with at least two active materials that are not adjacent to each other.

The binder polymer may be a binder polymer used as a dispersion in water.

The binder polymer may be styrene-butadiene rubber (SBR).

The Sn metal may be derived from $SnO_2$.

In another aspect of the present disclosure, there is also provided a secondary battery including an anode, a cathode, a separator interposed between the anode and the cathode and an electrolyte, wherein the anode is the above-described anode and the electrolyte contains a lithium salt.

The secondary battery may be used as a power source for hybrid & electric vehicles (HEV) or plug-in hybrid & electric vehicles (PHEV).

Advantageous Effects

In the anode for a secondary battery according to an embodiment of the present disclosure, Sn metal powder particles having excellent electroconductivity functions as a conduction material. Thus, the secondary battery including the anode has improved electroconductivity and reduced resistance.

In addition, the secondary battery is preferred as a power source for HEV or PHEV requiring a high output, by virtue of such reduced resistance.

BEST MODE

Figure 1:
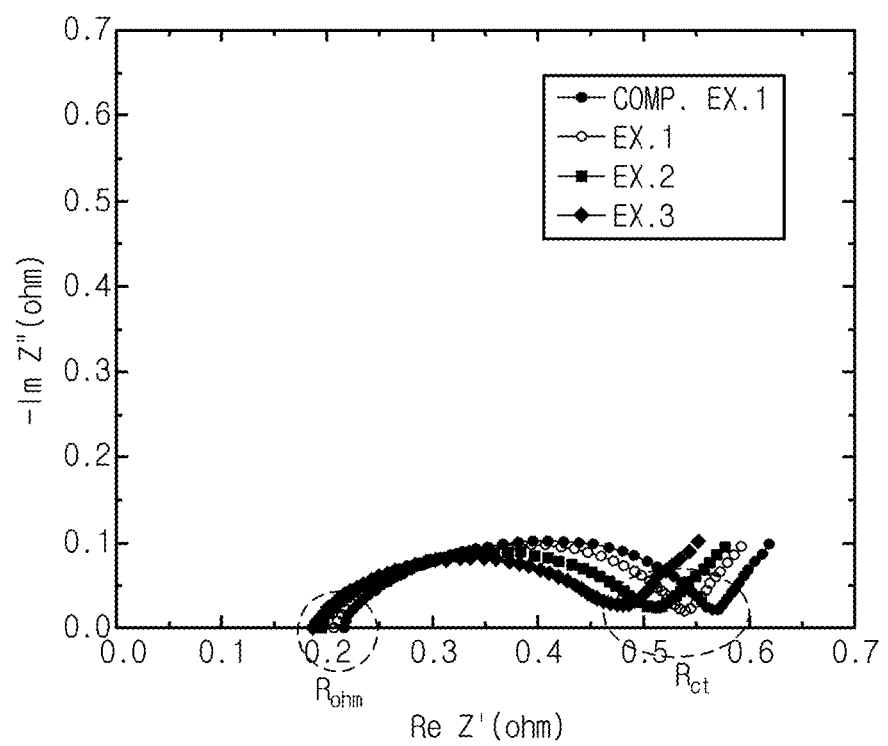
FIG. 1 is an electrochemical impedance spectroscopic (EIS) graph (at SOC50) illustrating that the monocell batteries of Examples 1-3 according to the present disclosure have lower charge transfer resistance at room temperature (25° C.) as compared to the monocell battery according to Comparative Example 1.
Figure 2A:
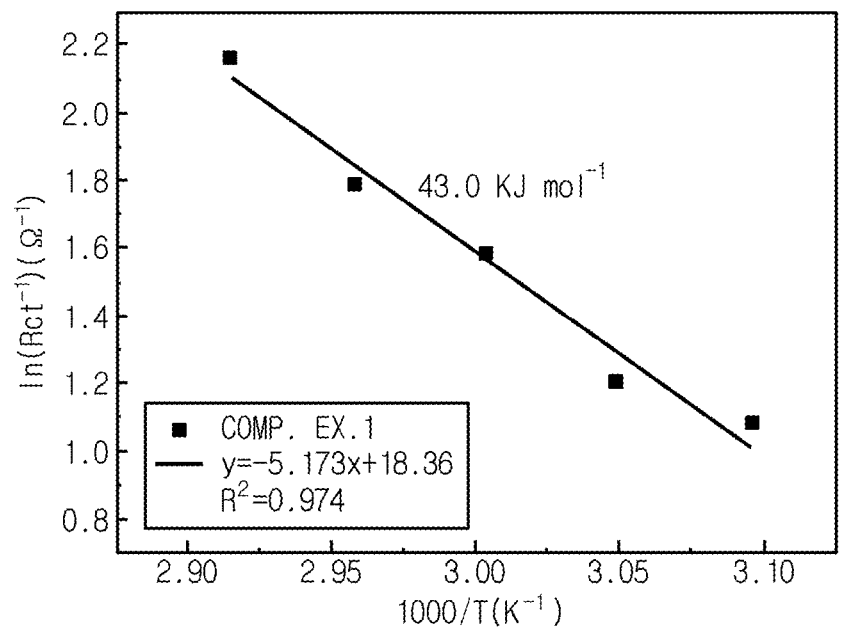
FIG. 2a-FIG. 2d show graphs illustrating the activation energy ($E_a$) required for charge transfer in each of the monocell batteries of Examples 1-3 according to the present disclosure and Comparative Example 1.
Figure 2B:
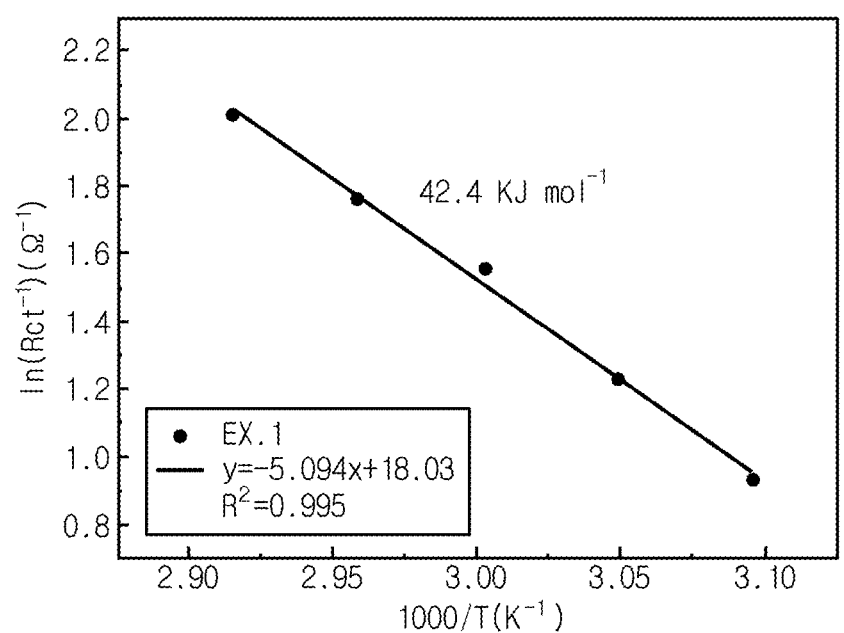
Figure 2C:
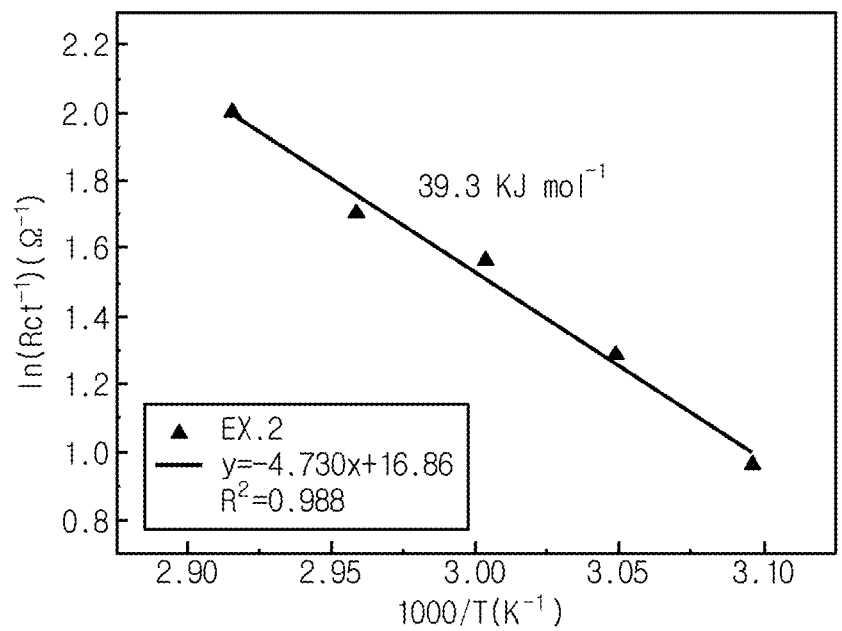
Figure 2D:
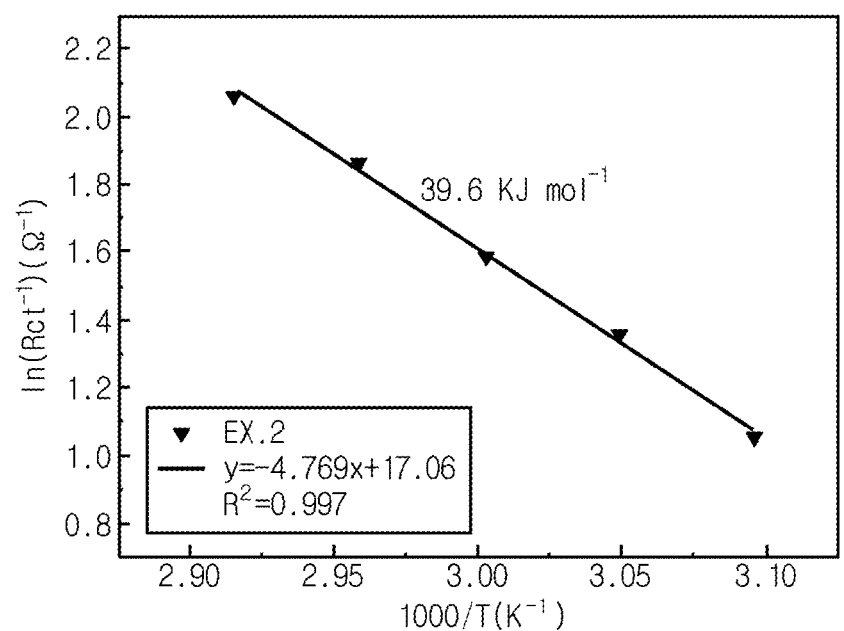

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided an anode for a secondary battery including an anode current collector and an anode active material layer formed on at least one surface of the anode current collector, wherein Sn metal powder particles function as a conductive material in combination with a carbonaceous conductive material in the anode active material layer.

'Sn metal powder particles' functioning as a conductive material in the anode according to the present disclosure should be present as Sn metal powder particles in the active material layer upon the operation of a battery. Therefore, not only (i) Sn metal powder particles but also (ii) tin oxide, if it can be converted into tin (Sn) metal through a process for preparing the active material layer or a battery operating process, may be used as a conductive material.

However, since tin oxide is converted into Sn through the following reaction formula, it may provide the same/a similar effect as/to the effect of Sn, but has a disadvantage in that the initial irreversible capacity is increased.

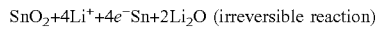

$SnO_2 + 4Li^+ + 4e^- \rightarrow Sn + 2Li_2O$ (irreversible reaction)

Meanwhile, if Sn metal or a Sn-containing compound cannot be converted into tin oxide ($SnO_2$) or the like through a process for preparing the active material layer or a subsequent process, such as addition of an alkaline compound and heat treatment, or Sn metal used in the above-defined content cannot function as a conductive material upon the operation of a battery, such an anode and a secondary battery including the same are not within the scope of the present disclosure.

Sn metal powder particles are present as a gray alpha allotrope and a silvery white beta allotrope. In view of stability, it is preferred to use beta type Sn metal in the form of powder.

In general, when a secondary battery for a HEV or PHEV has an operating voltage of 2.5V-4.5V and a carbonaceous material, such as graphite, is used as an anode active material, the anode available voltage (reaction potential) is designed to be 1.0V or less. Although Sn metal powder particles irreversibly contribute to charging/discharging at 1.0V or less which is within the anode available voltage range at the initial time, it is thought that they do not contribute significantly to charging/discharging in the above range subsequently. In other words, in a secondary battery for a HEV or PHEV using a carbonaceous anode active material, such as graphite, Sn metal powder particles are not used as an active material and thus does not significantly affect the unique characteristics, such as state of charge (SOC) or open circuit voltage (OCV), of a battery. In addition, Sn metal powder particles used as a conductive material according to the present disclosure causes no problem of deterioration resulting from shrinking and swelling under repeated charging/discharging, unlike Sn metal powder particles being used as active material.

Sn metal powder particles may consist of 100% of Sn or they may be doped with a small amount of bismuth, antimony, lead or silver in order to prevent deformation under a specific processing condition. Otherwise, Sn metal powder particles may be alloyed with a small amount of copper, antimony, bismuth, cadmium or silver so that they may have increased strength.

Sn metal powder particles may be powder in a form of primary particles having a particle diameter corresponding to about 10% or less of the particle size of the active material particles. For example, Sn metal powder particles may have a particle diameter of 0.01-1 μm or 0.1-1 μm but are not limited thereto. According to an embodiment, Sn metal powder particles may have an average particle diameter of about 100 nm. When Sn metal powder particles have the above-defined particle diameter, agglomeration of Sn metal powder particles is inhibited even after a secondary battery is subject to repeated charging/discharging for a long time, and thus formation of secondary particles is inhibited. In addition, in this case, Sn metal powder particles are mixed homogeneously with the elements forming the anode active material layer, such as the anode active material, other conductive materials and a binder, and Sn metal powder particles are inserted (interposed) between the active material particles, thereby improving electroconductivity. When Sn metal powder particles have an excessively small average particle diameter, the specific surface area of Sn metal powder particles is increased, resulting in an increase in decomposition of an electrolyte. For example, when Sn metal particles have a particle diameter less than 0.01 μm, the secondary battery may undergo degradation of its capacity retentivity. In addition, when Sn metal particles have a particle diameter larger than 1 μm, contact points between Sn metal powder particles and the active material are reduced, resulting in degradation of the effect as a conductive material. Herein, 'particle diameter' refers to particle diameter D50 which shows a volume-based particle size distribution and means a particle diameter corresponding to 50% of the total volume when volumetric accumulation is carried out from smaller particles after determining particle diameters.

According to an embodiment, Sn metal powder particles are used in combination with a carbonaceous conductive material. Use of Sn metal powder particles in combination with a carbonaceous conductive material reduces electric resistance, and allows the carbonaceous conductive material to supplement an insufficient function of a conductive material that may occur when Sn metal powder particles are used alone so that they may be used as an active material unintentionally.

Non-limiting examples of the carbonaceous material include graphite and carbon black, and non-limiting examples of carbon black include acetylene black, channel black, furnace black, lamp black and thermal black, but are not limited thereto.

Carbon black may be in the form of primary particles having an average particle diameter of 10-50 nm, particularly 30-40 nm. When graphite is used as a conductive material, it has a fibrous shape and length capable of point contact with non-adjacent two or more active materials, and thus improves electroconductivity.

Sn metal powder particles and the carbonaceous conductive material may be used at a ratio of 1:1-5:1 on the weight basis.

When the carbonaceous conductive material is used in combination with Sn metal powder particles at the above-defined ratio, it is possible to provide a synergic effect in improvement of electroconductivity and to supplement a large irreversible capacity of Sn metal powder particles.

According to an embodiment, the combined weight of Sn metal powder particles with the carbonaceous conductive material may be 1-10 wt %, 1-5 wt % or 3-5 wt % based on 100 wt % of the anode active material. When the content of the conductive material is smaller than the lower limit, it is not possible to provide a sufficient effect of improving electroconductivity. Even when the content of the conductive material is larger than the upper limit, there is no significant increase in electroconductivity, or irreversible capacity is increased highly due to the use of an excessive amount of Sn metal powder particles as a conductive material.

The anode active material that may be used according to the present disclosure is a material capable of intercalation/deintercalation of lithium ions and preferably is a material having a reaction potential (vs. $Li^+/Li$) lower than that of Sn metal powder particles. More particularly, preferred is an anode active material having an anode operating voltage of 1V or less, preferably 0.5V or less versus lithium. In this context, a carbonaceous anode active material may be used preferably. An anode active material, such as silicon, is not suitable for the present disclosure due to relatively high resistance.

As a carbonaceous anode active material, both low crystalline carbon and highly crystalline carbon may be used. Typical examples of the low crystalline carbon include soft carbon and hard carbon and those of highly crystalline carbon include natural graphite, Kish graphite, graphite, pyrolytic carbon, mesophase pitch based carbon fibers, meso-carbon microbeads, mesophase pitches and high-temperature baked carbon, such as petroleum or coal tar pitch derived cokes. For example, the anode active material may be natural graphite.

According to an embodiment, the carbonaceous anode active material preferably has a specific surface area of 10 $m^2/g$ or less. When the carbonaceous anode active material has a specific surface area larger than 10 $m^2/g$, the initial efficiency of the anode may be degraded. According to the present disclosure, the lower limit of the specific surface area of the carbonaceous anode active material is not particularly limited. Particularly, the lower limit may be 2 $m^2/g$ but is not limited thereto.

In addition, the carbonaceous anode active material may have an average particle diameter of 5-100 μm, preferably 5-40 μm. When the carbonaceous anode active material has an average particle diameter less than 5 μm, the initial efficiency of the anode may be degraded due to the fine carbonaceous powder. When the carbonaceous anode active material has an average particle diameter larger than 100 μm, coating processability of anode slurry may be degraded and scratches on the electrode may be increased.

According to an embodiment of the present disclosure, the content of the anode active material may be 50-95 wt %, preferably 70 wt % or more, based on 100 wt % of the anode active material layer.

The anode for a secondary battery may further include a binder polymer.

Particular examples of the binder polymer include various kinds of polymer resins, such as vinylidene fluoride-hexafluoropropylene copolymer (PVDF-co-HFP), polyvinylidene fluoride, polyacrylonitrile, polyacrylic acid, polymethyl methacrylate, styrene butadiene rubber (SBR), or the like. A waterborne binder, which can be used by dispersing it in water, is preferred in view of processing. More preferably, SBR binder polymer may be used as a binder polymer. The binder polymer may be used in an amount of 0.1-10 wt % based on 100 wt % of the anode active material layer.

According to the present disclosure, Sn metal powder particles are bound to the anode active material through the binder polymer. Thus, when the content of the binder polymer is less than the lower limit, binding of anode constitutional elements including Sn metal powder particles may be insufficient. However, when the content of the binder polymer is larger than the upper limit, resistance is increased excessively, which is not preferable.

In addition, the slurry for forming the anode active material layer according to the present disclosure may further include a thickener in order to control the viscosity of the slurry. Non-limiting examples of the thickener include carboxymethyl cellulose but are not limited thereto.

In another aspect, there is provided a method for manufacturing an anode for a secondary battery, which includes the steps of: (S1) mixing an anode active material, Sn metal particles or $SiO_2$, a carbonaceous conductive material and a binder polymer with a solvent to form a slurry; and (S2) coating the slurry on at least one surface of an anode current collector, followed by drying.

The solvent may be a solvent used conventionally in the art, and non-limiting examples of the solvent include N-methyl-2-pyrrolidone, acetone and water but are not limited thereto.

The coating and drying methods are not particularly limited, as long as they are used conventionally in the art.

In still another aspect, there is provided a secondary battery including the anode for a secondary battery. The secondary battery may have a operating voltage of 2.5-4.5V.

In addition, the secondary battery includes an anode, a cathode, a separator interposed between the cathode and the anode, and an electrolyte. The cathode, separator and electrolyte may be those used conventionally for manufacturing a lithium secondary battery.

The non-aqueous electrolyte includes an ionizable lithium salt and an organic solvent.

Particular examples of the lithium salt that may be contained in the non-aqueous electrolyte as an electrolyte may include those used conventionally for an electrolyte for a lithium secondary battery with no particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Particular examples of the organic solvent that may be contained in the non-aqueous electrolyte may include those used conventionally for an electrolyte for a lithium secondary battery with no particular limitation. For example, it is possible to use ethers, esters, amides, linear carbonates or cyclic carbonates alone or in combination. Typical examples of the organic solvent may include carbonate compounds such as cyclic carbonates, linear carbonates or mixtures thereof. Particular examples of the cyclic carbonate compounds include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate and halides thereof, or a combination thereof. In addition, particular examples of the linear carbonate compounds include any one selected from the group consisting of dimethyl carbonate (DMC), diethyl carbonate (DEC), dipropyl carbonate, ethyl methyl carbonate (EMC), methyl propyl carbonate and ethyl propyl carbonate, or a combination thereof, but are not limited thereto. Particularly, ethylene carbonate and propylene carbonate, which are cyclic carbonates among the carbonate organic solvents, have a high dielectric constant and dissociate the lithium salt in an electrolyte well, and thus are preferred. More preferably, it is possible to prepare an electrolyte having high electroconductivity when using such cyclic carbonates in combination with low-viscosity low-dielectric constant linear carbonates, such as dimethyl carbonate and diethyl carbonate, at an adequate ratio. Further, among the organic solvents, particular examples of the ethers may include any one selected from the group consisting of dimethyl ether, diethyl ether, dipropyl ether, methyl ethyl ether, methyl propyl ether and ethyl propyl ether, or a combination thereof, but are not limited thereto. Among the organic solvents, particular examples of the esters include any one selected from the group consisting of methyl acetate, ethyl acetate, propyl acetate, methyl propionate, ethyl propionate, γ-butyrolactone, γ-valerolactone, γ-caprolactone, σ-valerolactone and ε-caprolactone, or a combination thereof, but are not limited thereto.

In addition, a cathode and a separator used conventionally for manufacturing a lithium secondary battery may be used herein.

As a cathode active material, a lithium-containing transition metal oxide may be used preferably, and non-limiting examples thereof include any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\le y<1$), $Li_xNi_{1-y}Mn_yO_2$ ($0.5<x<1.3$, $0\le y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or a combination thereof. The lithium-containing transition metal oxide may be coated with a metal, such as aluminum (Al) or metal oxide. Besides the lithium-containing transition metal oxide, sulfide, selenide and halide may also be used.

Slurry for forming a cathode active material layer may include the same binder as used in the anode.

Particular examples of the separator include a porous polymer film used conventionally as a separator, including a porous polymer film made of a polyolefin polymer, such as an ethylene homopolymer, propylene homopolymer, ethylene/butane copolymer, ethylene/hexene copolymer or ethylene/methacrylate copolymer, and such a porous polymer film may be used alone or in the form of a laminate. Otherwise, conventional porous nonwoven webs, such as a nonwoven web including high-melting point glass fibers or polyethylene terephthalate fibers may be used, but the present disclosure is not limited thereto.

In still another aspect, there is provided a secondary battery including the anode. The secondary battery shows improved overall output characteristics and thus provides high output. In addition, the secondary battery shows excellent energy efficiency at low-temperature at SOC30 to SOC50, as demonstrated by the following examples.

Although there is no particular limitation in the outer shape of the secondary battery according to the present disclosure, the secondary battery may have a cylindrical, prismatic, pouch-like or coin-like shape.

The secondary battery may be a lithium secondary battery for hybrid electric vehicles (HEV) or plug-in hybrid electric vehicles (PHEV).

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

An anode active material was prepared by mixing 9.51 g of spherical natural graphite, 0.1 g of Sn (Alfa Sesar, Sn powder 0.1 micron) and 0.1 g of carbon black as conductive materials, and 0.22 g of waterborne styrene-butadiene rubber (SBR). The ingredients were added to water as a solvent and mixed to provide an anode slurry. The resultant anode slurry was applied onto one surface of a copper current collector and dried at about 60° C. for 24 hours to obtain an anode having a size of 13.33 cm². Ethylene carbonate (EC), dimethyl carbonate (DMC) and ethyl methyl carbonate (EMC) were mixed at a volume ratio of 1:2:7 and $LiPF_6$ was added to the mixed non-aqueous electrolyte solvent to obtain 1M $LiPF_6$ non-aqueous electrolyte. As a cathode, NMC 622 ($LiNi_{0.6}Mn_{0.2}Co_{0.2}O_2$) 100% electrode was used. A polyolefin separator was interposed between the cathode and the anode and the electrolyte was injected to obtain a pouch-type monocell.

Example 2

An anode was manufactured in the same manner as Example 1, except that 0.3 g of Sn was used. Then, a pouch-type monocell was manufactured.

Example 3

An anode was manufactured in the same manner as Example 1, except that 0.5 g of Sn was used. Then, a pouch-type monocell was manufactured.

Comparative Example 1

An anode was manufactured in the same manner as Example 1, except that no Sn was used. Then, a pouch-type monocell was manufactured.

Test Example

The secondary batteries obtained according to Examples 1-3 and Comparative Example 1 were charged to 4V under a constant current condition, and then charged under a constant voltage condition at 4V until the current reaches 0.1 C. Then, discharging was carried out to 2.8V under a constant current condition.

Evaluation of Charge Transfer Resistance

FIG. 1 is an electrochemical impedance spectroscopic (EIS) graph (at SOC50) illustrating that the monocell batteries of Examples 1-3 according to the present disclosure have lower charge transfer resistance at room temperature (25° C.) as compared to the monocell battery according to Comparative Example 1.

It can be seen from FIG. 1 that the monocell batteries according to Examples 1-3 show lower charge transfer resistance as compared to the monocell battery according to Comparative Example 1 and that the conductive materials used for the batteries function better. It can be also seen that the monocell batteries according to Examples 1 to 3 show significantly improved output as compared to Comparative Example 1.

The reasons why resistance is decreased as mentioned above include: 1) excellent electroconductivity of Sn metal (about 35 times of Super-C), and 2) a different mechanism of interfacial charge transfer. It is thought that Sn metal has a different mechanism of interfacial charge transfer as compared to the other conductive materials. This can be determined through different interfacial charge transfer resistance (Rct) and low activation energy (Ea).

Evaluation of Activation Energy (Ea) of Charge Transfer

FIG. 2a-FIG. 2d show graphs illustrating the activation energy ($E_a$) required for charge transfer in each of the monocell batteries of Examples 1-3 according to the present disclosure and Comparative Example 1.

A lithium transfer process in a lithium secondary battery conforms to the following Arrhenius equation. Thus, activation energy can be calculated from the gradient ($-E_a/R$) in $\ln(1/R_{ct})$ vs. $1/T$ plotting:

$$1/R_{ct} = A \exp(-E_a/RT)$$

$$\ln(1/Rct) = \ln A - E_a/R \times 1/T$$

wherein $R_{ct}$ represents charge transfer resistance, A represents a preexponential factor, $E_a$ represents activation energy, R is a general gas constant, and T represents absolute temperature (K).

Referring to FIG. 2a-FIG. 2d, the monocell batteries according to Examples 1-3 have a lower activation energy as compared to the monocell battery according to Comparative Example 1, and thus shows smaller charge transfer resistance.

Evaluation of Output

Figure 3:
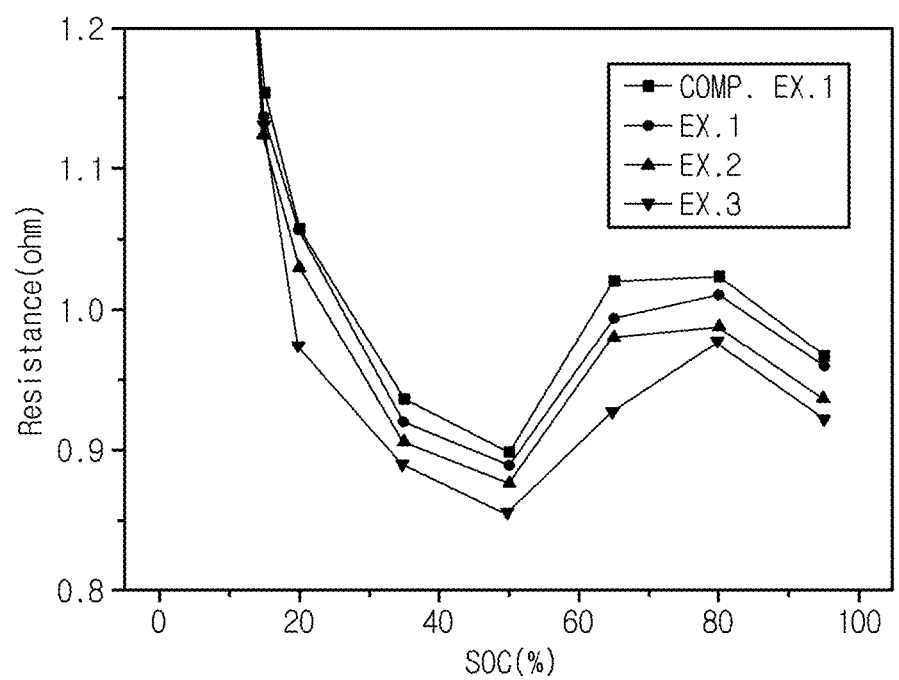
FIG. 3 is a graph illustrating a change in resistance depending on a change in state of charge (SOC) in each of the monocell batteries of Examples 1-3 according to the present disclosure and Comparative Example 1.

FIG. 3 is a graph illustrating a change in resistance depending on a change in state of charge (SOC) in each of the monocell batteries of Examples 1-3 according to the present disclosure and Comparative Example 1.

Referring to FIG. 3, the monocell batteries including 1-5 wt % of Sn based on 100 wt % of the anode active material according to Examples 1-3 significantly reduces resistance as compared to the monocell battery according to Comparative Example 1. Thus, it is shown that the batteries according to examples 1-3 show excellent output behavior as compared to the monocell battery according to Comparative Example 1. Particularly, the batteries according to Examples 1-3 show the most significant decrease in resistance at SOC50.

Measurement of Charge/Discharge Capacity

Figure 4A:
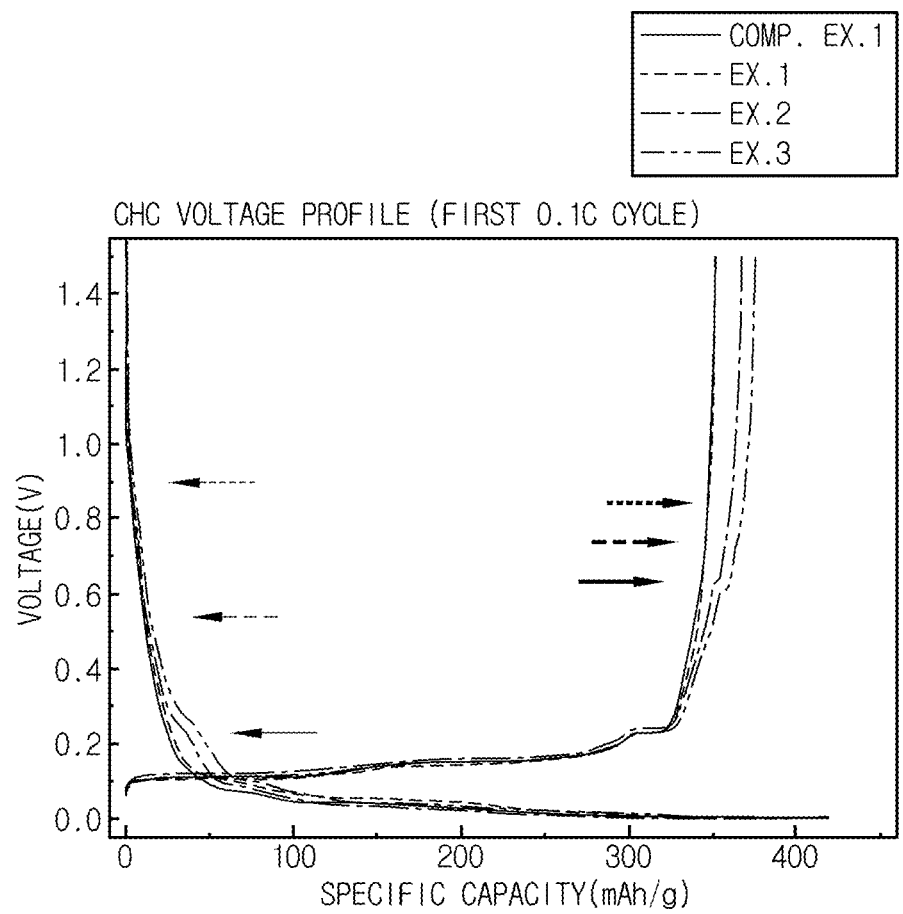
FIG. 4a is a graph illustrating capacity realized by each of the monocell batteries of Examples 1-3 according to the present disclosure and Comparative Example 1.

FIG. 4a is a graph illustrating capacity realized by each of each of the monocell batteries of Examples 1-3 according to the present disclosure and Comparative Example 1.

Referring to FIG. 4a, the monocell batteries according to Examples 1-3 has a larger charge/discharge capacity as compared to the monocell battery according to Comparative Example 1. The monocell battery according to Example 3 which has the highest content of Sn shows the most significant increase in charge/discharge capacity.

Figure 4B:
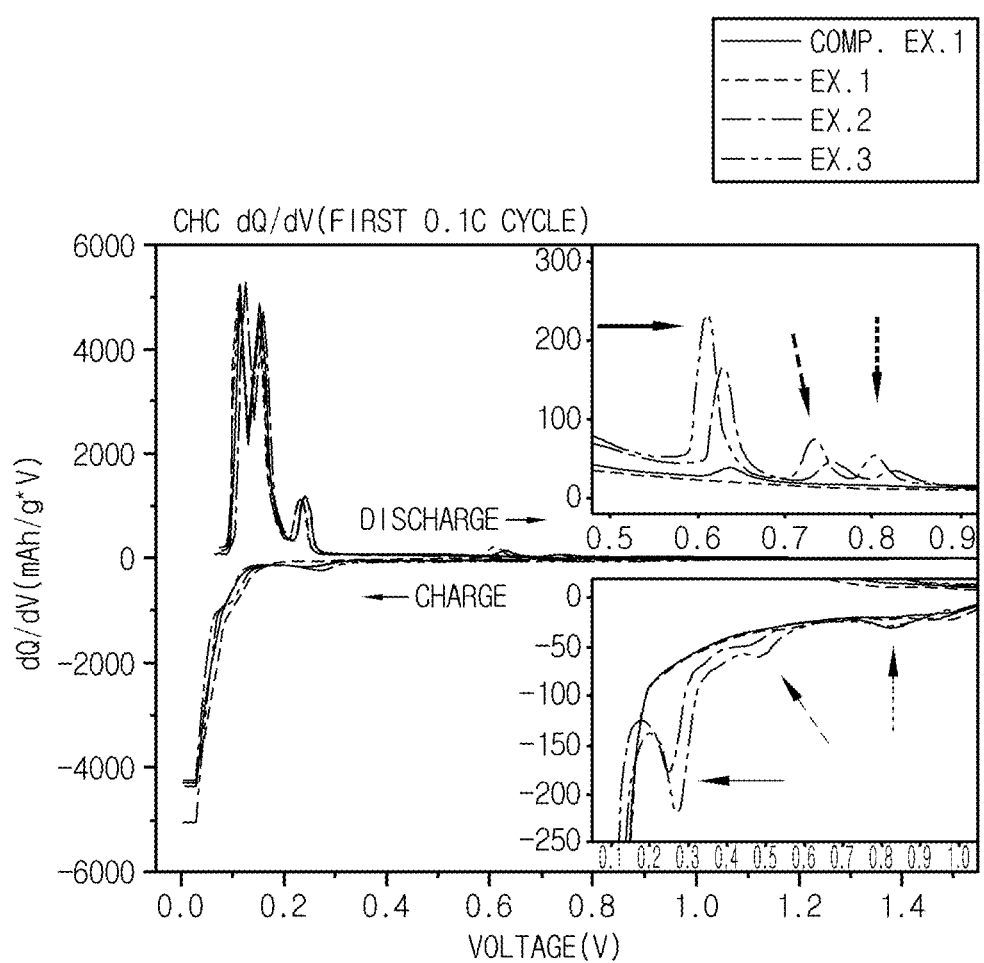
FIG. 4b is a dQ/dV graph of the graph of FIG. 4a as a function of voltage.
Figure 5:
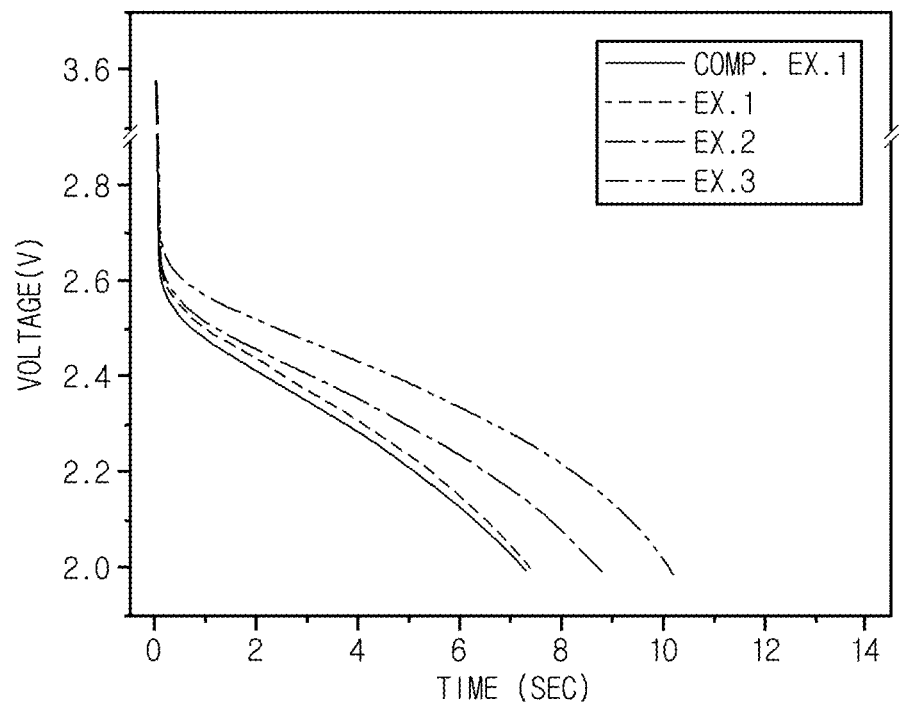
FIG. 5 is a graph illustrating the low-temperature resistance of each of Examples 1-3 according to the present disclosure and Comparative Example 1.

In addition, referring to FIG. 4b illustrating a dQ/dV graph of the graph of FIG. 4a as a function of voltage, it can be seen that a capacity different from the surroundings is realized at 0.25 V (thin arrow mark represented by the solid line), 0.5V (thin arrow mark represented by the broken line) and 0.83V (thin arrow mark represented by the dotted line) during charging, and at 0.6V (thick arrow mark represented by the solid line), 0.73V (thick arrow mark represented by the broken line) and 0.8V (thick arrow mark represented by the dotted line) during discharging. It is thought that such a change is caused by the expression of capacity of Sn particles.

Meanwhile, the following Table 1 shows the charge/discharge capacity and charge/discharge efficiency of each of the monocell batteries according to Examples 1-3 and Comparative Example 1. Referring to Table 1, when introducing Sn metal powder particles, the electroconductivity of the monocell battery is increased and the capacity thereof is also increased. However, when the content of Sn metal powder particles is larger than 5 wt %, a tendency for the charge/discharge efficiency to reduce, i.e., a tendency for the irreversible capacity to increase becomes severe. Thus, it is preferred that Sn is incorporated in an amount of 5 wt % or less.

TABLE 1

| 0.1 C 1st cycle | Charge (mAh/g) | Discharge (mAh/g) | Efficiency (%) |
|---|---|---|---|
| Comp. Ex. 1 | 385.07 | 351.38 | 91.3% |
| Ex. 1 | 387.25 (0.6%) | 355.06 (1.0%) | 91.7% |
| Ex. 2 | 410.14 (6.5%) | 372.58 (6.0%) | 90.8% |
| Ex. 3 | 420.90 (9.3%) | 376.30 (7.1%) | 89.4% |

Evaluation of Low-Temperature Performance

The time required for each battery to reach 2.0V under the condition of −10° C., 370 mA and SOC30 is measured to evaluate resistance at low temperature. As a result, the batteries according to Examples 1-3 require a longer time to reach 2V as compared to Comparative Example 1. In addition, this appears most significantly in Example 3. Thus, it can be seen that the anode of Example 3 has the lowest low-temperature resistance.

TABLE 2

| SOC30 | Comp. Ex. 1 | Ex. 1 | Ex. 2 | Ex. 3 |
|---|---|---|---|---|
| Time to reach Vmin (2 V) | 7.3 | 7.4 | 8.8 | 10.2 |
| Time extension (%) | — | +1.4% | +20.5% | +37.7% |

SEM Image

Figure 6:
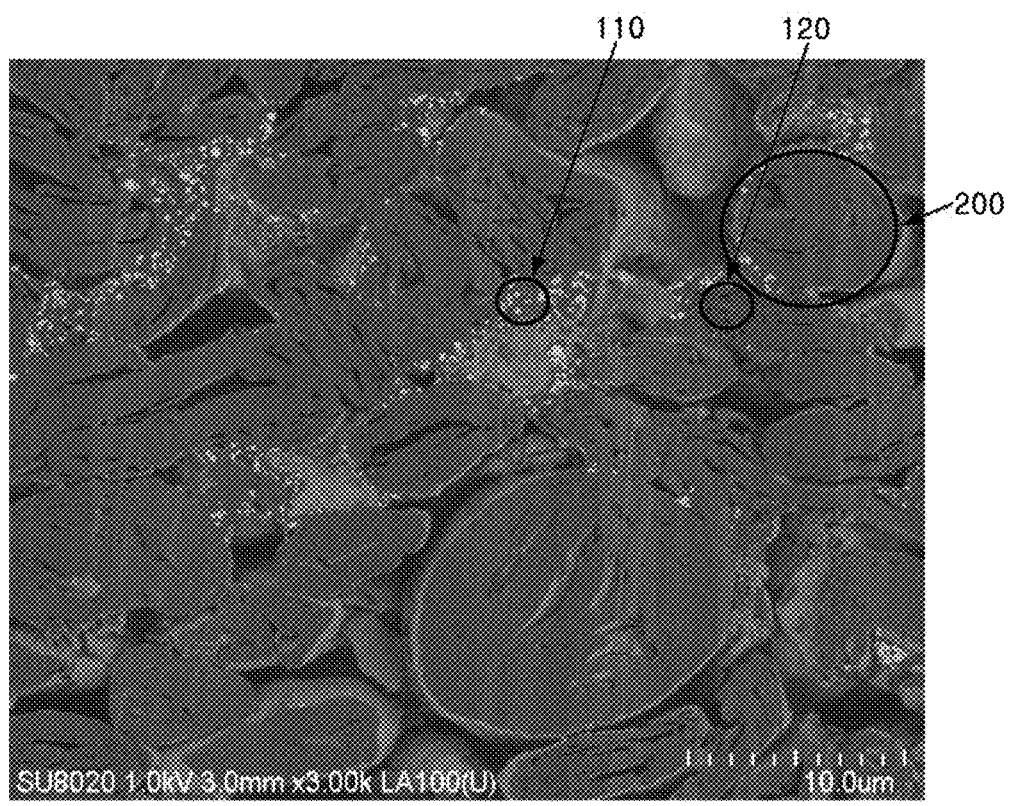
FIG. 6 is a scanning electron microscopic (SEM) photograph illustrating the anode of example 1 according to the present disclosure.

FIG. 6 is a scanning electron microscopic (SEM) photograph illustrating the anode of Example 1. According to FIG. 6, Sn metal powder particles 110 surround the circumference of the active material particle 200 and carbon black 120 also surrounds the circumference of the active material particle 200. Since Sn metal powder particles and carbon black have a different particle diameter, they are complementary in surrounding the circumference of the active material particle and functioning as conductive materials.

What is claimed is:

1. An anode for a secondary battery comprising:
    an anode current collector and
    a carbonaceous anode active material layer formed on at least one surface of the anode current collector,
    wherein the active material layer comprises a mixture of an active material, a carbonaceous conductive material and Sn metal powder particles,
    wherein the Sn metal powder particles function as a conductive material in combination with the carbonaceous conductive material, and
    wherein the active material is a carbonaceous active material and the active material does not include silicon,
    wherein the Sn metal powder particles have a particle diameter corresponding to 10% or less of the particle diameter of the active material,
    wherein the active material is different than the carbonaceous conductive material.

2. The anode for a secondary battery according to claim 1, wherein the Sn metal powder particles are bound to the active material through a binder polymer.

3. The anode for a secondary battery according to claim 1, wherein the Sn metal powder particles and the carbonaceous conductive material are included at a ratio of 1:1-5:1 on the weight basis.

4. The anode for a secondary battery according to claim 1, wherein the Sn metal powder particle are present in an amount of 1-5 wt % based on 100 wt % of the active material.

5. The anode for a secondary battery according to claim 1, wherein the Sn metal powder particles have an average diameter of 0.01-1 μm.

6. The anode for a secondary battery according to claim 1, wherein the carbonaceous conductive material is carbon black primary particles having a spherical shape with an average particle diameter of 10-50 nm.

7. The anode for a secondary battery according to claim 1, wherein the carbonaceous conductive material is fibrous graphite capable of point contact with at least two active materials that are not adjacent to each other.

8. The anode for a secondary battery according to claim 2, wherein the binder polymer is a binder polymer dispersed in water.

9. The anode for a secondary battery according to claim 2, wherein the binder polymer is styrene-butadiene rubber (SBR).

10. The anode for a secondary battery according to claim 1, wherein the Sn metal powder particles are derived from $SnO_2$.

11. A secondary battery comprising an anode, a cathode, a separator interposed between the anode and the cathode and an electrolyte, wherein the anode is the anode as defined in claim 1 and the electrolyte contains a lithium salt.

* * * * *